(12) United States Patent
Ionescu

(10) Patent No.: US 7,872,426 B2
(45) Date of Patent: Jan. 18, 2011

(54) BALLAST PROTECTING DEVICE

(75) Inventor: Adrian Florentine Ionescu, Cluj-Napoca (RO); Andrei E. Ionescu, legal representative, Mount Prospect, IL (US)

(73) Assignee: Power Control Technologies, Inc., Wilmington, DE (US)

( * ) Notice: Subject to any disclaimer, the term of this patent is extended or adjusted under 35 U.S.C. 154(b) by 563 days.

(21) Appl. No.: 10/595,415

(22) PCT Filed: Oct. 18, 2004

(86) PCT No.: PCT/US2004/034097

§ 371 (c)(1),
(2), (4) Date: Dec. 4, 2009

(87) PCT Pub. No.: WO2005/039239

PCT Pub. Date: Apr. 28, 2005

(65) Prior Publication Data

US 2010/0141150 A1  Jun. 10, 2010

Related U.S. Application Data

(60) Provisional application No. 60/481,520, filed on Oct. 17, 2003.

(51) Int. Cl.
*G05F 1/00* (2006.01)
(52) U.S. Cl. .................................................. 315/291
(58) Field of Classification Search ................ 315/291, 315/224, 244, 209 R, 307

See application file for complete search history.

(56) References Cited

U.S. PATENT DOCUMENTS

| 5,452,173 | A | 9/1995 | Brannon et al. |
| 5,521,491 | A | 5/1996 | Najam |
| 6,191,568 | B1 * | 2/2001 | Poletti ......................... 323/268 |
| 6,326,740 | B1 * | 12/2001 | Chang et al. ................. 315/291 |
| 6,534,933 | B2 * | 3/2003 | Shen ........................... 315/307 |
| 6,661,185 | B2 * | 12/2003 | Kominami et al. ........... 315/291 |

OTHER PUBLICATIONS

PCT International Search Report (ISR) for PCT/US2004/34097 mailed Aug. 29, 2005.

* cited by examiner

*Primary Examiner*—Douglas W Owens
*Assistant Examiner*—Minh D A
(74) *Attorney, Agent, or Firm*—Connolly Bove Lodge & Hutz LLP

(57) ABSTRACT

A ballast protecting device is connected between an AC input voltage and a ballasted lamp. The device includes a voltage sensing block, a current sensing block, a pulse forming block, a switch block, and a micro-controller unit (MCU). The pulse forming block converts positive half cycles of the voltage and current provided by the voltage and current sensing blocks to square wave pulses, and the MCU performs a phase angle comparison between generated pulses. Upon lamp malfunction, ballast current is phase shifted. Current may also be phase shifted when there is a radical change in the input voltage. As a trend of the phase shift between current and voltage is determined by the MCU, a ballast disconnect decision is made, and the MCU actuates the switch block to disconnect the connected ballast and malfunctioning lamp.

8 Claims, 8 Drawing Sheets

BALLAST PROTECTING DEVICE

CROSS REFERENCE TO RELATED APPLICATIONS

This application is a National Stage Entry under 35 U.S.C. §371 of International Application PCT/US04/034097. PCT/US04/034097 claims priority to U.S. Provisional Application 60/481,520 filed on Oct. 17, 2003. The entire contents of both of these applications are incorporated herein by reference.

BACKGROUND

This disclosure relates to alternating current voltage controllers, more particularly to controllers for removing the ballast current in the event of a lamp fault to avoid the flow of reactive energy through the ballast, and for further avoiding the overall system power factor degradation associated with multiple ballast systems.

The need of maintaining a high power factor of high-intensity-discharge (HID) lighting systems including ballasts and lamps is critical in large lighting systems, particularly in the event of a lamp malfunction or a lamp shut down. Furthermore, the degradation of the lighting system's power factor may result in the failure to comply with electrical power standards for various areas or countries. Ultimately, most utilities companies are using both active and reactive energy counters in large industrial electric systems, such as public illumination systems. This would result in paying the bill for unnecessary reactive energy in the event the ballast operates with a defective lamp.

SUMMARY

Embodiments of this disclosure provide a device and method for protection against power factor degradation of a ballast operating with a defective lamp. Trend evaluation is available for the voltage/current phase angle to determine a temporary higher angle caused by sharp variation of the AC line voltage and/or lamp temperature. Trend evaluation may provide automatic discrimination against transient high phase angle situations to avoid unnecessary or premature removal of the ballast current, but will also detect lamp malfunctions, and will disconnect the lamp ballast from the power mains.

In one embodiment, a ballast protecting device includes a voltage sensing circuit adapted to receive an AC input voltage across first and second voltage input terminals; a current sensing circuit having an input connected to the first voltage input terminal and a first output connected to one output terminal of the device; a pulse forming circuit having an input connected between an output terminal of the voltage sensing block and a second output of the current sensing circuit, wherein the output terminal of the voltage sensing block provides a reference signal in phase with the AC input voltage, and the second output of the current sensing circuit provides a signal representing a phase of a current through the device relative to the reference signal; a switch unit arranged between the second voltage input terminal and another output terminal of the device, and controller means operatively connected to the pulse forming circuit and the switch unit for determining a phase angle difference between the reference signal and the current through the device and for controlling the switch unit in response to the determined phase angle difference, wherein the switch unit electrically disconnects the second voltage input terminal from said another output terminal of the device when the controller means determines an undesired phase angle trend.

In other aspects of this embodiment, the pulse forming circuit comprises a comparator which provides a series of square wave pulses during a positive half-wave of the AC input voltage. The pulse forming circuit may also comprise a comparator which provides a series of square wave pulses during a positive half-wave of the signal representing the phase of the current through the device.

In other aspects of this embodiment, the switch unit comprises an electromechanical relay which, when in an open state, interrupts a current flow between an input terminal and an output terminal of the device. The switch unit may also comprise a solid state switch electrically connected across the electromechanical relay, wherein the solid state switch interrupts the current flow between an input terminal and an output terminal of the device upon detection of a current zero crossing condition. The solid state switch may be a triac.

In another embodiment, a method for controlling a ballast current includes establishing a reference phase angle of an input voltage; sensing a phase angle of an input current with respect to the reference phase angle; forming pulses representing the reference phase angle and the input current phase angle; analyzing the pulses and determining a trend of a relative input current phase angle over a time period; and interrupting the ballast current upon determining an adverse phase angle trend.

BRIEF DESCRIPTION OF THE DRAWINGS

Various aspects of this disclosure are described more fully with reference to the attached drawings in which.

DETAILED DESCRIPTION

Figure 1:
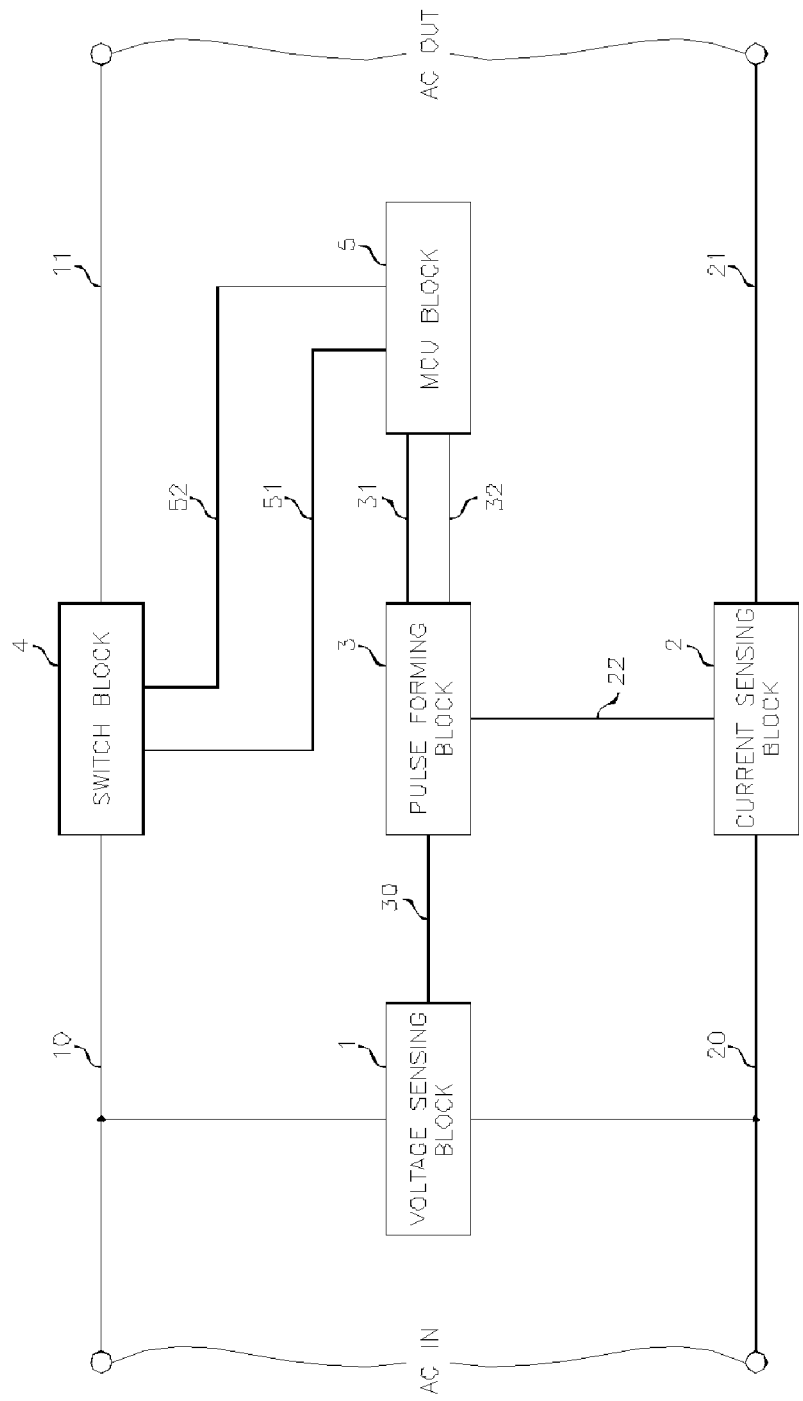
FIG. 1 is a block diagram of a one embodiment of the disclosure.

An embodiment of this disclosure will be described below with reference to the drawings. FIG. 1 provides a block diagram showing principal elements. The energy is applied to the ballast from the energy source AC IN via line 10, via normally closed switch block 4, via line 10, then through AC OUT and further via line 21, current sensing block 2 and line 20. Voltage sensing block 1 attenuates the magnitude of the AC line voltage AC IN present on lines 10 and 20 to a usable value for the small signal electronic components, such as comparators, for example. Voltage sensing block 1 should not introduce any phase shifting on output line 30, so that the phase of the signal present on line 30 is identical with the phase of the AC line voltage present on line 10.

Current sensing block 2 converts the current through lines 20 and 21 to an electric signal of identical phase with the current via lines 20 and 21. Pulse forming block 3 converts each positive half cycle of signals collected from lines 30 and 22 into square wave pulses. Square wave pulses corresponding both to the positive half cycle of the AC line voltage, AC IN, and current via lines 20 and 21 are applied via lines 31 and 32 to micro-controller unit (MCU) 5, where the information contained in the relative phase angles between both square wave pulses on lines 31 and 32 is processed in order to determine whether switch block 4 should be actuated to block the current through the ballast connected to the output, i.e., whether to disconnect the voltage input from the device output. Switch block 4 is controlled by MCU 5 via signals on lines 51 and 52.

MCU 5 may be a special purpose processor, or may be implemented by chip sets commonly used in a personal computer configuration. MCU 5 may be programmed by firmware or by known software techniques.

It is generally known that any HID lamp needs a certain amount of time to warm-up and to reach its normal operating parameters. This amount of time may vary with the type and power of the lamp, value of the AC line voltage, and the ambient temperature. Extensive tests have been conducted by the inventor using a 250 W CWA high-pressure sodium (HPS) ballast, but the phenomenon is similar using all HID ballasts.

Indeed, upon turning the ballast ON, the current is phase shifted compared to the AC line voltage with about −40 degrees, meaning the ballast characteristic prior to reaching the normal operating parameters is capacitive. As the lamp warms-up, the current/voltage phase angle is approaches zero in several minutes. After the lamp has fully warmed-up and the ballast has reached its nominal operating parameters, the voltage/current phase angle is about 10 to 15 degrees, meaning the ballast electric behavior is now inductive.

A sharp change in the AC line voltage also causes an increase in the voltage/current phase angle. As the lamp's temperature changes in accordance with the magnitude of the AC line voltage, the voltage/current phase angle diminishes.

When the lamp is malfunctioning, or when the lamp is turning off, the voltage/current phase angle is reaching extremely high values. When the ballast is hot, the copper temperature coefficient causes a higher resistance of the ballast windings and, as the temperature is reduced as a natural result of the un-ignited lamp, the resistive component of the ballast is diminished, and the inductive component becomes predominant. As a result, the voltage/current phase angle increases as the ballast reduces its temperature.

Because of all above described changes of the voltage/current phase angle, including the time interval when the lamp is warming-up, MCU 5 processes the voltage/current phase angle information as follows:

In one aspect of the embodiment, when a ballast/lamp operating anomaly is causing voltage/current phase angle to exceed 45 degrees, MCU 5 may record the current/voltage phase angle, then may wait 3 minutes or other appropriate period of time before making another phase angle measurement. If the second phase angle measurement indicates a lower value than the one previously measured, the ballast is not disconnected by switch block 4 from the AC line voltage, AC IN.

If the second phase angle measurement indicates a higher or equal value than the previous measurement value, the ballast may be disconnected by switch block 4 from the AC line voltage, AC IN. If the ballast is disconnected, a waiting period of time, e.g., 30 minutes, before MCU 5 causes switch block 4 to re-connect the ballast to the AC line voltage AC ON. This waiting period of time, 30 minutes, for example, depends on lamp characteristics, and is required by the knowledge that the lamp must cool-off before a re-strike attempt. After the 30 minute time interval has expired, MCU 5 may cause switch block 4 to re-connect the ballast to the AC line voltage source, AC IN.

Then, the periodic phase angle trend evaluation, e.g., every 3 minutes, is applied again by MCU 5, as described above. In the event there are 3 consecutive unsuccessful attempts to re-strike the lamp, MCU block 5 could be programmed to infer that there is a permanent lamp malfunction requiring service and lamp replacement.

A ballast operating without a lamp represents a heavy inductive load, as the above-described voltage/current phase angle of over 70 degrees confirms. This phenomenon may present a series of problems for switch block 5. Indeed, in one aspect of this disclosure, it is desired that switch block 5 provide a physical contact, such as a relay, to avoid energy dissipation in the form of heat that is specific to all solid state devices. At the same time, for reliability, the relay should be backed-up by a solid state device, because the actual ballast disconnect should happen when the ballast current on lines 10, 11, 21 and 20 is zero, or else a high value voltage transient may destroy the relay's contacts.

Figure 2:
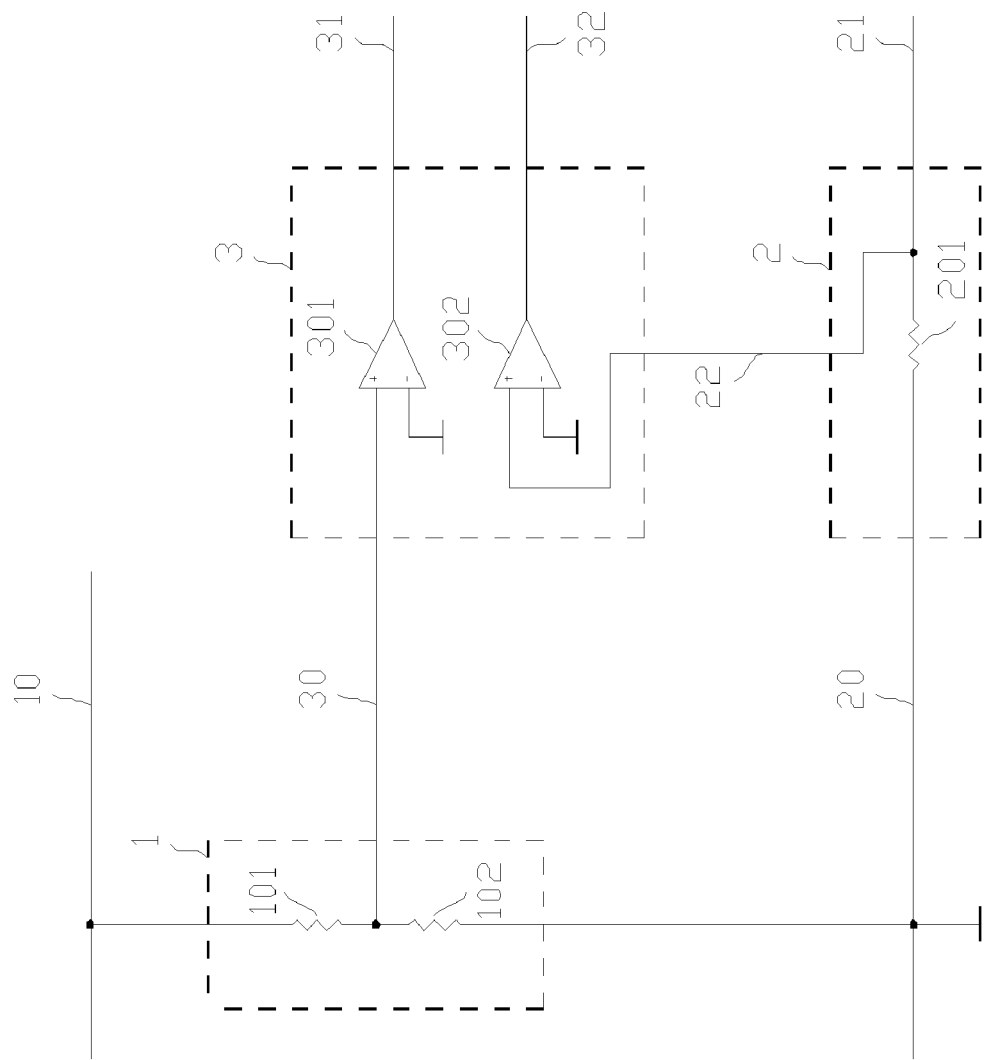
FIG. 2 shows a more detailed diagram of various aspects of the voltage sensing block 1, current sensing block 2 and pulse forming block 3.

FIG. 2 describes voltage sensing block 1, current sensing block 2, and pulse forming block 3. Resistors 101 and 102 perform a voltage divider function to deliver a low amplitude signal via line 30 to the pulse forming block 3. Current sensing block 2 includes current sensing resistor 201, but a current transformer could also be used, without departing from the spirit of this disclosure.

A signal equivalent to the ballast current on lines 10, 11, 21 and 20 is applied to pulse forming block 3 by current sensing block 2 via line 22. Pulse forming block 3 contains two comparators 301 and 302 for sensing and converting positive half cycles of signals on lines 30 and 22 into square wave pulses provided to MCU 5 via lines 31 and 32.

Figure 3:
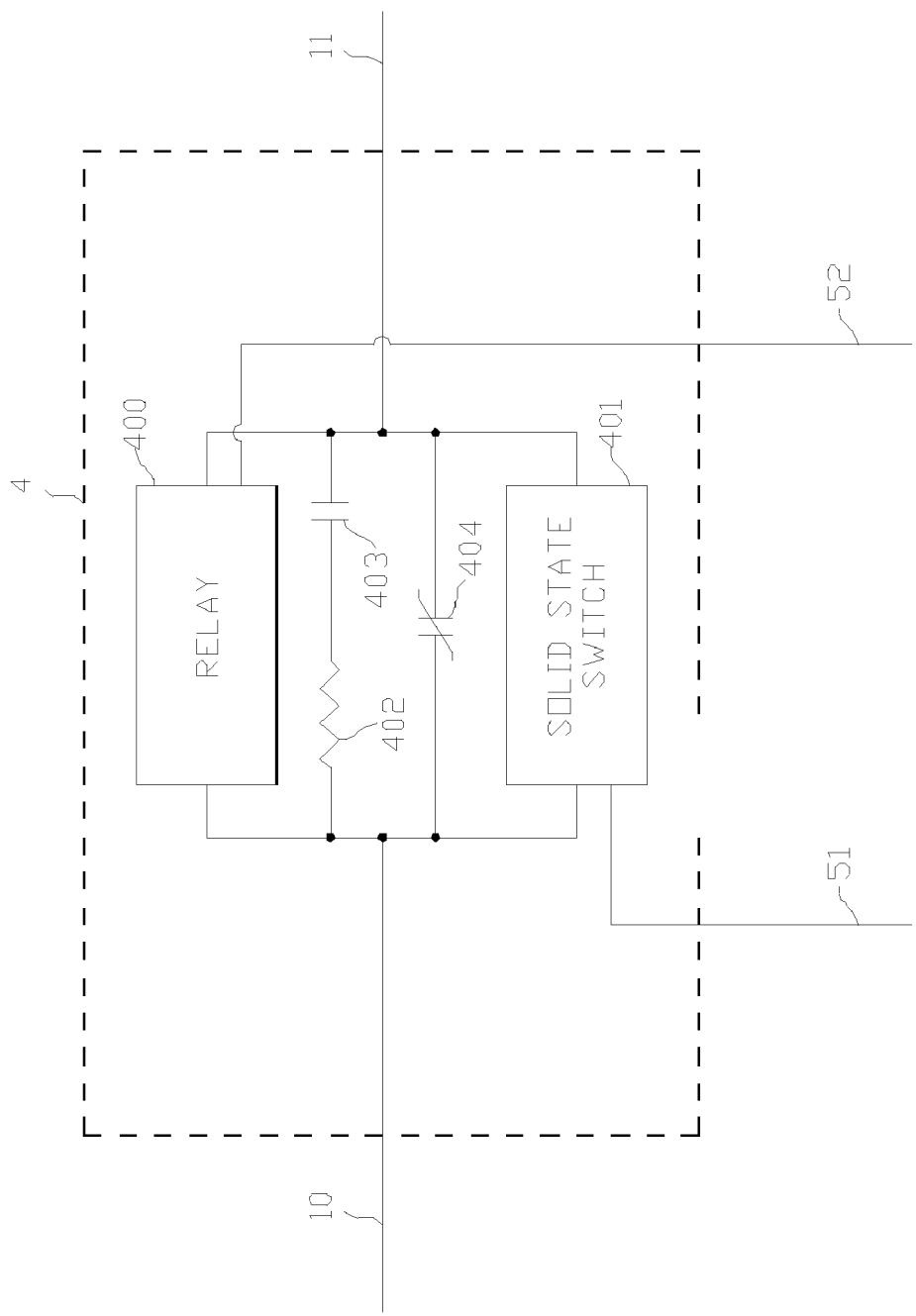
FIG. 3 shows an implementation of the internal configuration of the switch block 4.

FIG. 3 illustrates an implementation of switch block 4, which includes electromechanical relay 400 for avoiding energy dissipation in form of heat due to an inherent voltage drop common to all solid state devices. Solid state switch 401 interrupts the ballast current at the desired zero-crossing current moment in order to avoid high energy voltage spikes across contacts of relay 400. Such high energy voltage spikes are commonly encountered in disconnecting heavy inductive loads at random moments.

In one aspect of this embodiment, a triac may be used as solid state device 401, but any other suitable solid state component or components could be used without departing from the spirit of this disclosure, such as common source antiparallel MOSFETS or IGBT's, with integral antiparallel diodes, for example. Indeed, a triac presents the property that, once the gate signal is removed, it turns itself off at the next ballast current zero crossing.

Snubber network 402 and 403 are used to limit dV/dt, i.e., the rate of change of voltage with respect to time, of the energy present across relay 400 contacts upon contact separation. A metal oxide varistor 404 may further attenuate this amount of energy.

In an exemplary aspect of this embodiment, the operation sequences are as follows: When the ballast is disconnected from the AC line voltage source AC IN, MCU 5 turns off relay 400 via controlling line 52. Simultaneously, a gate signal is applied to solid state device 401 (e.g., a triac) by MCU 5 via line 51, as an attempt to turn triac 401 on. As relay 400 contacts are shorting both anodes of triac 401, triac 401 is in an OFF state. However, as relay 400 contacts are separated, a voltage spike is generated across the relay's contacts.

Snubber network 402 and 403, along with metal oxide varistor 404 attenuate the dV/dt parameter of the voltage spike. As the voltage across relay 400 contacts is increasing, triac 401 is beginning to conduct, as its state is now ON. Triac 401 is turned on even faster, because a high dV/dt across its anodes accelerates the turning-on process. It is known that, when the anodes' voltage exceeds a certain rate of increase or a certain rise time, i.e., dV/dt is greater than a certain threshold, triac 401 may turn itself ON, even in the absence of a gate signal.

All of these components and effects protect relay 400 contacts against arcing, burning, or corrosion. After relay 400 is actually turned off—this process requires several tens of milliseconds after the turning-off command is given by MCU 5 via controlling line 52—triac 401 may be maintained in its ON state by MCU 5 via controlling line 51 for up to a half second or so, then the gate signal on triac 401 is removed. As a result, triac 401 will naturally turn itself off at the next ballast current zero crossing.

In another exemplary aspect of this embodiment, the ballast reconnecting process is as follows: In order to avoid high turning-on current transients, the ballast current may be restored at the zero crossing of the AC line voltage, AC IN. Indeed, at that moment, MCU 5 may simultaneously apply the turn-on of signals via controlling lines 51 and 52. As a result, triac 401 is turning on, and several tens of milliseconds later, relay 400 contacts will short triac 401 in order to avoid energy dissipation in form of heat from triac 401. After one second or so, MCU 5 may remove the controlling signal for triac 401 on line 51, as triac 401 no longer needs to be maintained in the ON condition.

Figure 4:
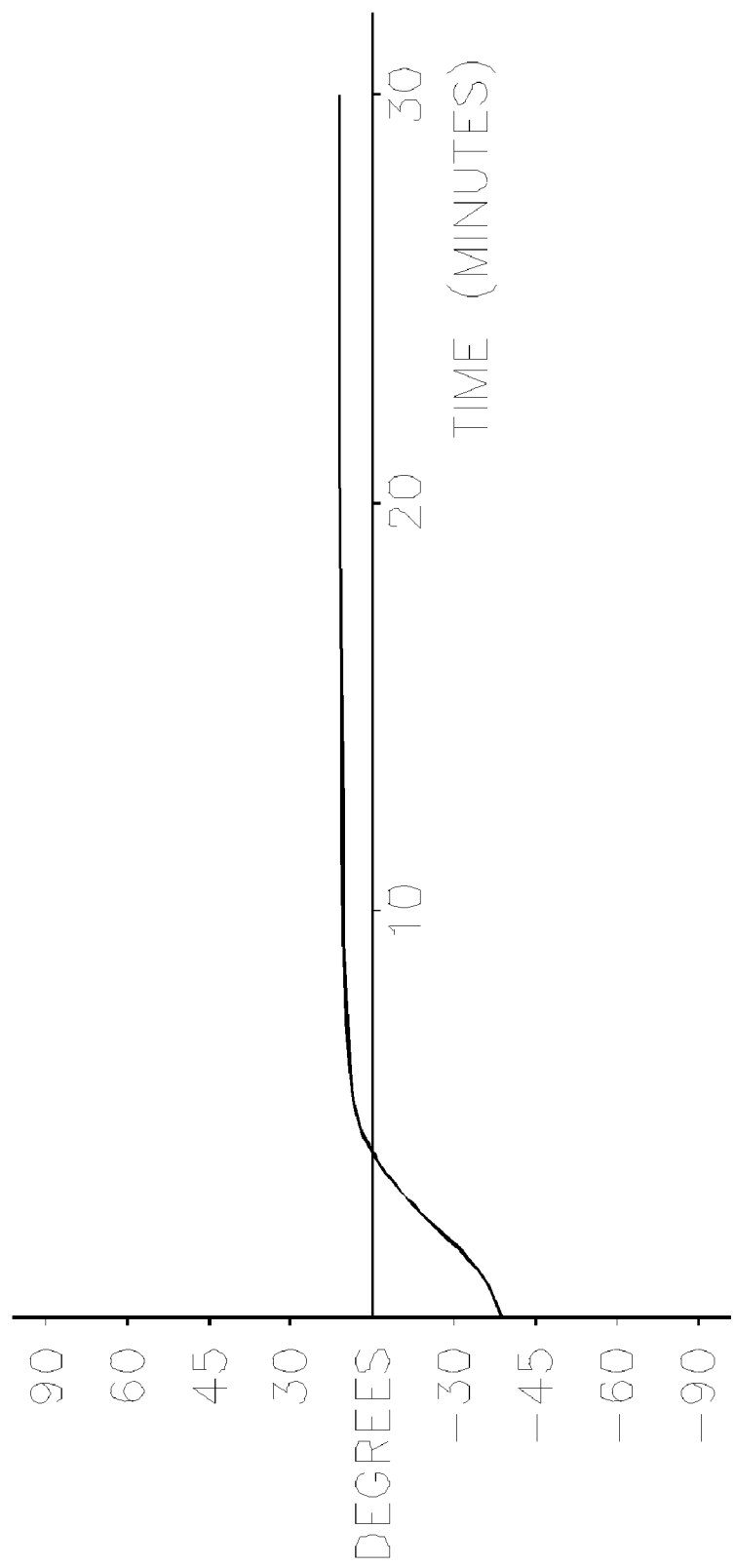
FIG. 4 describes the voltage/current phase angle of a CWA—Constant Wattage Output Ballast after being energized.

FIG. 4 illustrates a voltage/current phase angle turning on sequence of a 250 W CWA HPS (high pressure sodium) ballast.

Figure 5:
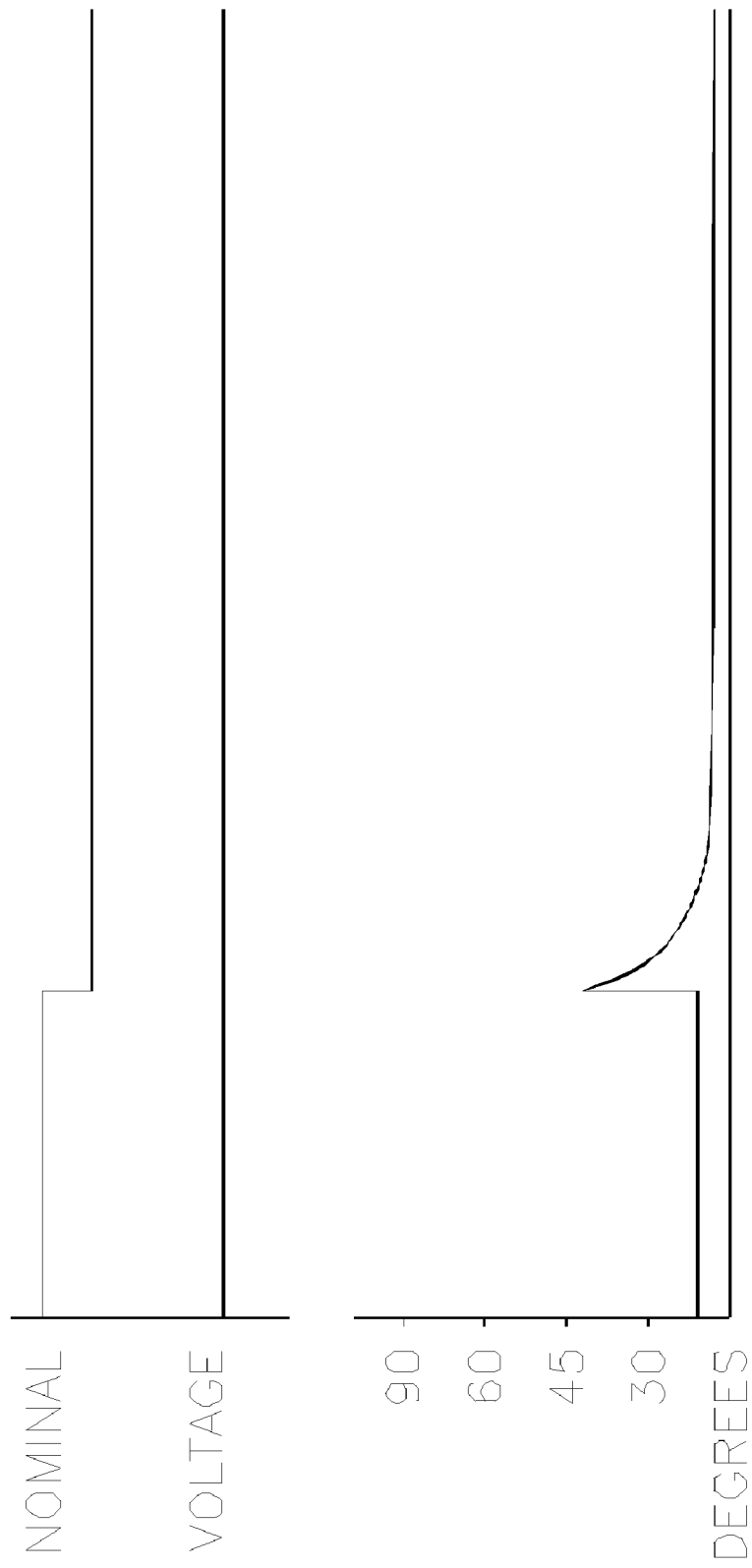
FIG. 5 describes the voltage/current phase angle of a fully warmed ballast when the AC IN line voltage is sharply changing.

FIG. 5 illustrates a voltage/current phase angle temporary anomaly of a 250 W CWA HPS ballast when a 15 V sharp drop of the AC line voltage AC IN occurs.

Figure 6:
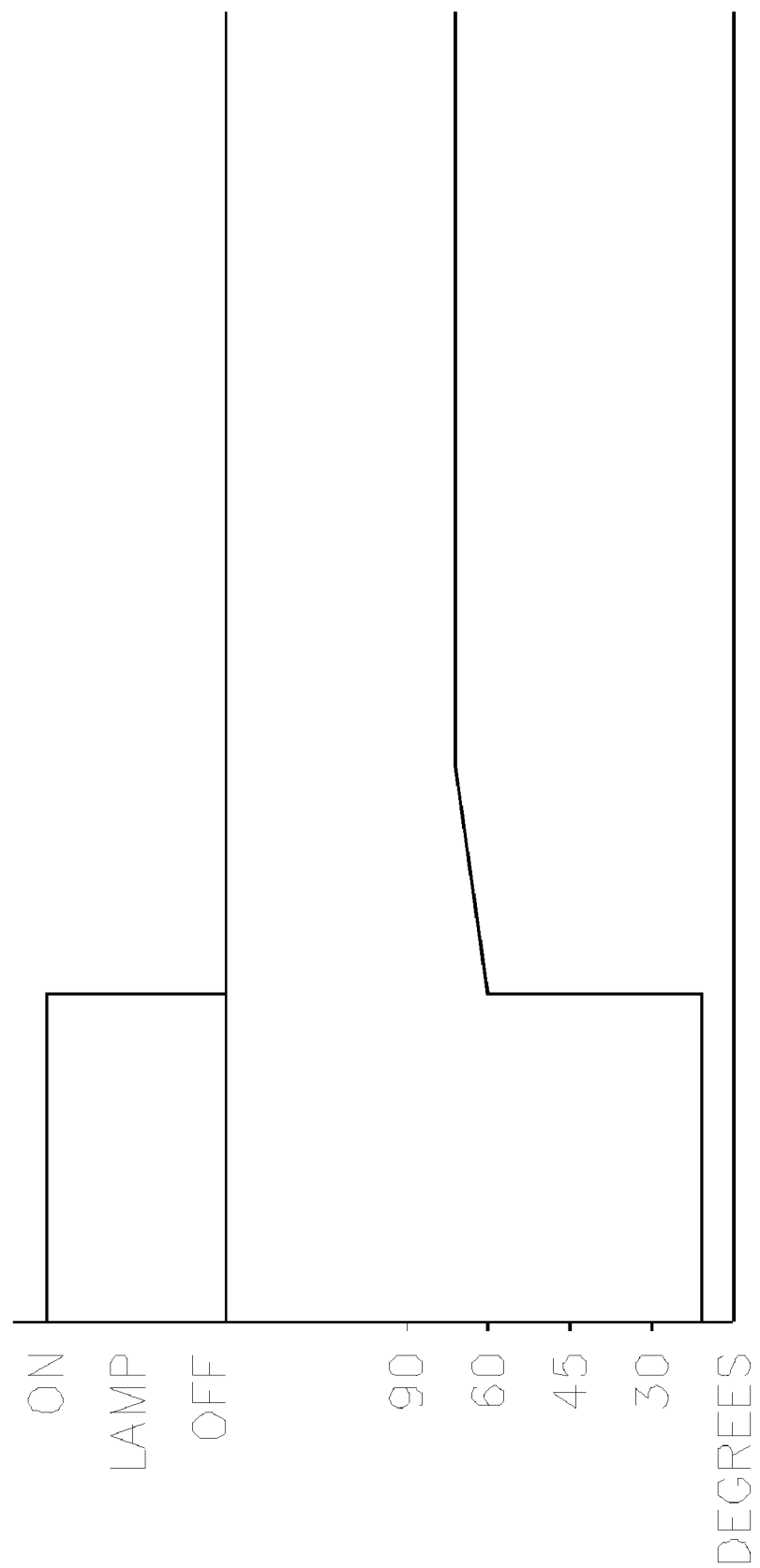
FIG. 6 describes the voltage/current phase angle when the lamp shuts off for any reason, including a physical disconnection or a defective lamp.

FIG. 6 illustrates a voltage/current phase angle of a 250 W CWA HPS ballast when the HPS lamp is extinguished for a variety of reasons. As the ballast temperature is decreasing after the lamp turn-off moment, the resistive component of the ballast windings caused by copper's inherent temperature coefficient is decreasing. Therefore, the voltage/current phase angle increases due to the ballast inductive component becoming more dominant than the resistive component.

Figure 7:
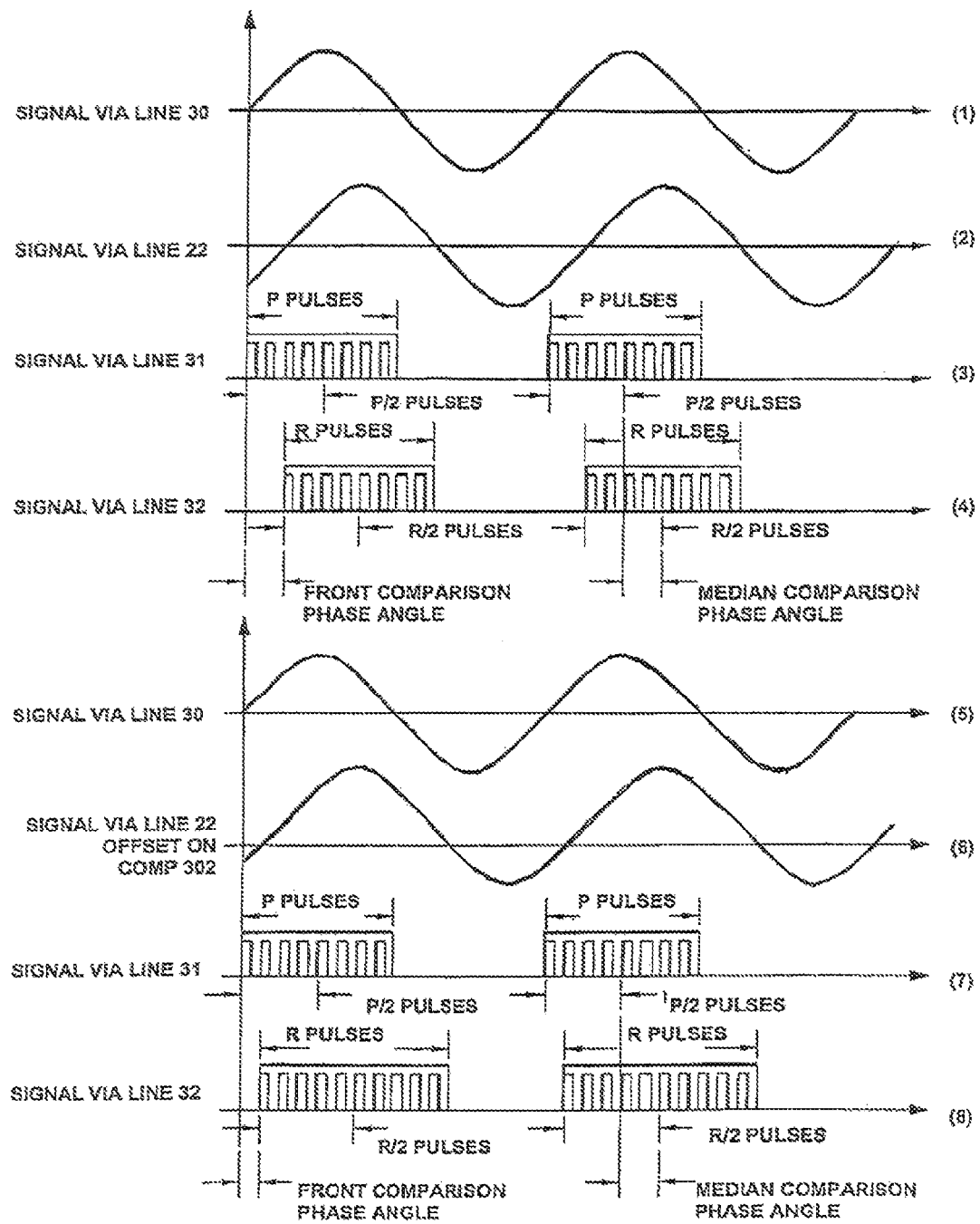
FIG. 7 describes the automatic elimination of the effect caused by the temperature coefficient of comparators 301 and/or 302 included in pulse forming block 3.

FIG. 7 shows automatic compensation of an eventual input offset voltage drift caused by its inherent temperature coefficient. Graph (1) shows the AC line voltage AC IN on lines 10 and 20, and the equivalent attenuated signal on line 30. Graph (2) shows the ballast current on lines 10, 11, 21 and 20 and the equivalent signal on line 22. It is assumed that neither of comparators 301 and 302 of pulse forming block 3 have any input voltage offsets. Graphs (3) and (4) show the pulses on lines 31 and 32, represented by "P" pulses, and "R" pulses, respectively.

There are two methods to determine the phase of the pulses on lines 31 and 32. The first method is to compare the time interval between the fronts (rising front) of pulses on lines 31 and 32, while the second method is to compare the time interval between the middle of pulses on lines 31 and 32. The middle of each pulse on lines 31 and 32 is determined by MCU 5 by dividing in half the numbers P and R of externally generated high frequency pulses counted during the duration of each pulse on lines 31 and 32. The middle so determined of the pulses on lines 31 and 32 may be named MEDIANS.

Indeed, as all graphs (1), (2), (3) and 4 show that, in the absence of any input voltage offset of comparators 301 and 302 contained by pulse forming block 3, both methods are error free. However, as graphs (5), (6), (7) and (8) indicate, when one of the comparators 301 and 302 included in pulse forming block 3 is experiencing a different than zero input-offset voltage, the only method that eliminates any voltage/current phase angle measurement error is by measuring the time interval between the MEDIANS of pulses on lines 31 and 32, rather than when measuring the time interval between the fronts of these pulses on lines 31 and 32.

Figure 8:
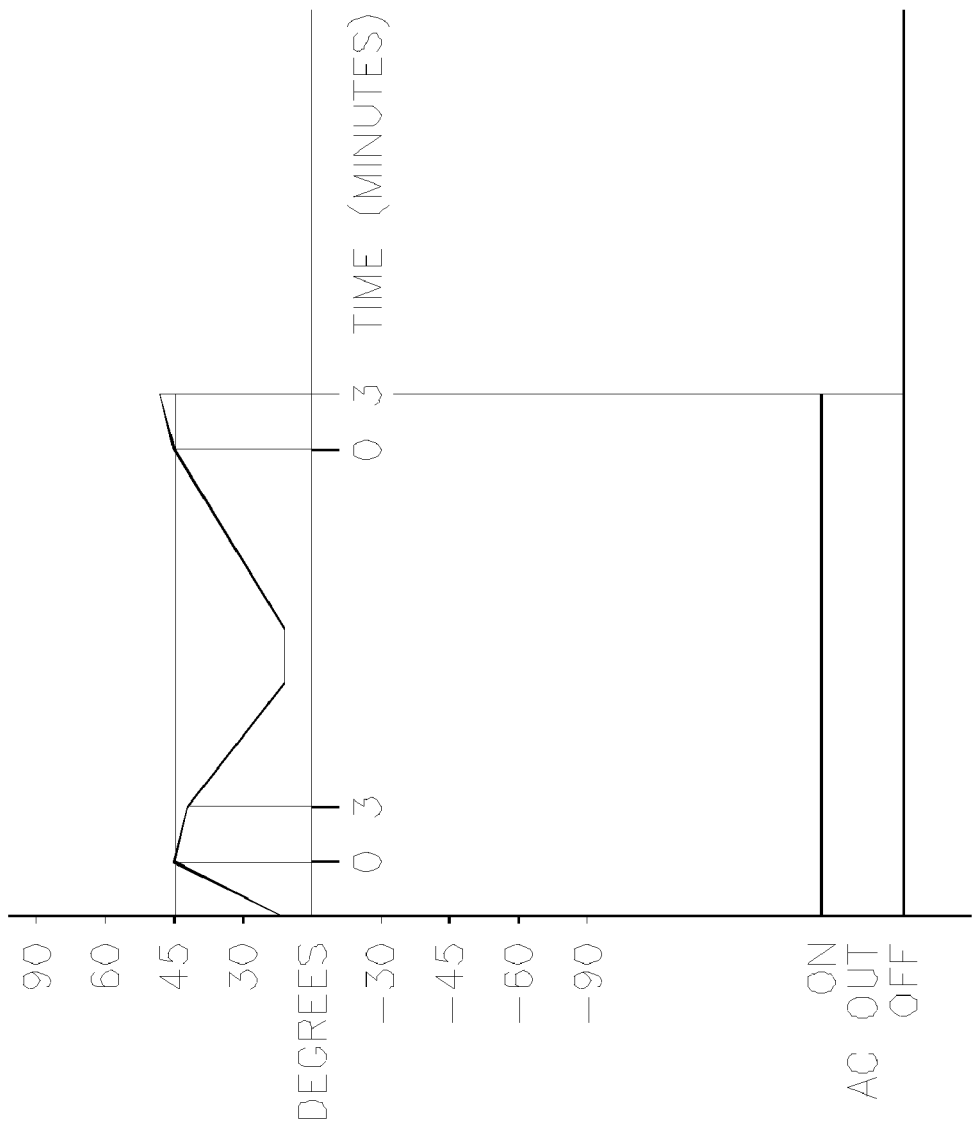
FIG. 8 describes phase angle trend evaluation for discriminating against false, temporary phase angle increases.

FIG. 8 illustrates an example of a 3 minute voltage/current phase angle trend evaluation by MCU 5 for discriminating against false abnormally high voltage/current phase angle to avoid having the ballast unnecessarily disconnect from the AC line voltage source AC IN.

The foregoing description shows and describes certain embodiments of the disclosure, but it is to be understood that various aspects of the disclosure are capable of use in various other combinations, modifications, and environments, and is capable of changes or modifications within the scope of the inventive concept as expressed herein, commensurate with the above teachings, and/or the skill or knowledge of the relevant art. The embodiments described above are further intended to explain best modes known of practicing the disclosure and to enable others skilled in the art to utilize the disclosure in such, or other, embodiments and with the various modifications required by the particular applications or uses contemplated. Accordingly, the description is not intended to limit the invention to the form disclosed herein. Also, it is intended that the appended claims be construed to include alternative embodiments.

What is claimed as new and desired to be protected by Letters Patent of the United States is:

1. A ballast protecting device, comprising:
a voltage sensing circuit adapted to receive an AC input voltage across first and second voltage input terminals;
a current sensing circuit having an input connected to the first voltage input terminal and a first output connected to one output terminal of the device;
a pulse forming circuit having an input connected between an output terminal of the voltage sensing block and a second output of the current sensing circuit,
wherein the output terminal of the voltage sensing block provides a reference signal in phase with the AC input voltage, and the second output of the current sensing circuit provides a signal representing a phase of a current through the device relative to the reference signal;
a switch unit arranged between the second voltage input terminal and another output terminal of the device, and
controller means operatively connected to the pulse forming circuit and the switch unit for determining a phase angle difference between the reference signal and the current through the device and for controlling the switch unit in response to the determined phase angle difference,
wherein the switch unit electrically disconnects the second voltage input terminal from said another output terminal of the device when the controller means determines an undesired phase angle trend.

2. The device of claim 1, wherein the pulse forming circuit comprises a comparator which provides a series of square wave pulses during a positive half-wave of the AC input voltage.

3. The device of claim 2, wherein the pulse forming circuit further comprises a comparator which provides a series of square wave pulses during a positive half-wave of the signal representing the phase of the current through the device.

4. The device of claim 1, wherein the pulse forming circuit comprises a comparator which provides a series of square wave pulses during a positive half-wave of the signal representing the phase of the current through the device.

5. The device of claim 1, wherein the switch unit comprises an electromechanical relay which, when in an open state, interrupts a current flow between an input terminal and an output terminal of the device.

6. The device of claim 5, wherein the switch unit further comprises a solid state switch electrically connected across the electromechanical relay, wherein the solid state switch interrupts the current flow between an input terminal and an output terminal of the device upon detection of a current zero crossing condition.

7. The device of claim 6, wherein the solid state switch is a triac.

8. A method for controlling a ballast current, the method comprising:

establishing a reference phase angle of an input voltage;

sensing a phase angle of an input current with respect to the reference phase angle;

forming pulses representing the reference phase angle and the input current phase angle;

analyzing the pulses and determining a trend of a relative input current phase angle over a time period; and interrupting the ballast current upon determining an adverse phase angle trend.

\* \* \* \* \*